US008065367B1

(12) United States Patent
Stanley (10) Patent No.: US 8,065,367 B1
(45) Date of Patent: Nov. 22, 2011

(54) METHOD AND APPARATUS FOR SCHEDULING REQUESTS DURING PRESENTATIONS

(75) Inventor: David J. Stanley, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 334 days.

(21) Appl. No.: 11/831,195

(22) Filed: Jul. 31, 2007

(51) Int. Cl.
*G06F 15/16* (2006.01)
(52) U.S. Cl. ........................................ 709/205; 709/204
(58) Field of Classification Search .................. 709/204, 709/205
See application file for complete search history.

(56) References Cited

U.S. PATENT DOCUMENTS

| 5,295,184 | A | * | 3/1994 | Smith et al. | ............. | 379/216.01 |
| 5,651,050 | A | * | 7/1997 | Bhagat et al. | ................. | 455/431 |
| 5,859,663 | A | * | 1/1999 | Simon | ......................... | 348/14.07 |
| 6,968,367 | B1 | * | 11/2005 | Vassar et al. | ................... | 709/219 |
| 2002/0192631 | A1 | * | 12/2002 | Weir et al. | ..................... | 434/350 |
| 2003/0220826 | A1 | * | 11/2003 | Mansour | ........................... | 705/8 |
| 2004/0120484 | A1 | * | 6/2004 | Buzbee | ....................... | 379/93.17 |
| 2007/0086585 | A1 | * | 4/2007 | Dorricott et al. | ......... | 379/265.01 |
| 2007/0100939 | A1 | * | 5/2007 | Bagley et al. | ................. | 709/204 |
| 2007/0121859 | A1 | * | 5/2007 | Smelyansky et al. | ......... | 379/158 |
| 2007/0150583 | A1 | * | 6/2007 | Asthana et al. | ............... | 709/224 |
| 2007/0285504 | A1 | * | 12/2007 | Hesse | ......................... | 348/14.08 |
| 2008/0288323 | A1 | * | 11/2008 | Demsky et al. | .................... | 705/9 |
| 2008/0320082 | A1 | * | 12/2008 | Kuhlke et al. | ................. | 709/205 |
| 2009/0005038 | A1 | * | 1/2009 | Yasrebi et al. | ............. | 455/435.1 |
| 2009/0083377 | A1 | * | 3/2009 | Ben-Haim et al. | ............ | 709/204 |
| 2009/0093240 | A1 | * | 4/2009 | Lang | ............................. | 455/416 |
| 2009/0220064 | A1 | * | 9/2009 | Gorti et al. | ............... | 379/202.01 |

* cited by examiner

*Primary Examiner* — Mohamed Wasel
(74) *Attorney, Agent, or Firm* — Park, Vaughan, Fleming & Dowler LLP; Steven E. Stupp (57) ABSTRACT

A system that schedules requests and receives scheduling requests from multiple users. The system receives a given scheduling request from a portable device associated with a given user, such that the given scheduling request is associated with a question to be asked by the given user. Next, the system queues the scheduling requests and selectively couples the given user to a communication channel, which allows the given user to ask the question.

19 Claims, 6 Drawing Sheets

FIG. 6 ns during presentations.

Question-and-answer sessions are a popular format for exchanging information. However, in a forum with a large and/or a geographically distributed audience, such as a large lecture hall or during an on-line (Internet-based) presentation, it can be difficult to manage this exchange of information. For example, in a large lecture hall audience members can only ask questions if they are proximate to a microphone. Consequently, only a small subset of interested audience members may be able to ask questions.

Moreover, in a question-and-answer session it is often difficult for a moderator to guide the discussion and/or to emphasize interesting subject matter when the questions are not known in advance. However, when the questions are known in advance, such as when they are written down, it is difficult to have a dynamic interaction between a speaker and the audience members during the question-and-answer session.

SUMMARY

One embodiment of this invention provides a system that schedules requests. During operation, this system receives scheduling requests from multiple users, where a given scheduling request is received from a portable device associated with a given user, and where the given scheduling request is associated with a question to be asked by the given user. Next, the system queues the scheduling requests and selectively couples the given user to a communication channel, which allows the given user to ask the question.

In some embodiments, the system registers users prior to receiving the scheduling requests, where registration of the given user involves receiving user information, including an identifier associated with the given user and a communication address. Note that the communication address may include a telephone number associated with the portable device and/or an email address.

In some embodiments, the portable device includes a cellular telephone.

In some embodiments, the given user uses the portable device as a microphone to ask questions during a presentation. Moreover, the given user may be physically present at a location where the presentation is occurring, or may be located remotely from the location where the presentation is occurring. Note that the presentation may include an on-line training session.

In some embodiments, a scheduling request for the given user includes a message transmitted by the portable device. This message may include a text message and/or a telephone call. Moreover, in some embodiments the queuing involves temporarily placing the telephone call on hold or storing a place holder for the telephone call and discontinuing the telephone call. In these embodiments, the selective coupling involves calling the given user back.

In some embodiments, receiving of the scheduling requests involves converting a voice message to text.

In some embodiments, the queuing involves identifying subject matter in the scheduling requests.

In some embodiments, the system provides additional information to those users who are unable to ask their questions during an allotted time interval.

In some embodiments, the system adjusts the selective coupling to reduce feedback effects in the communication channel when the given user asks the question.

Another embodiment provides a method for scheduling requests, which may perform at least some of the above-described operations.

Another embodiment provides a computer program product for use in conjunction with the system. This computer program product may include instructions corresponding to at least some of the above-described operations.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a device, a system, a method, and a computer program product (i.e., software) for use with the system are described. These devices, systems, software, and processes may be used to schedule requests (such as questions) from one or more users, such as audience members, during a presentation. In particular, scheduling requests received from users may be queued (based on a time received and/or subject matter) and particular users may be selectively coupled to a communication channel to allow these users to ask their questions. In some embodiments, the users may be physically present at a location where the presentation is occurring and/or may be located remotely from the location where the presentation is occurring (for example, the presentation may include an on-line training session).

In some embodiments, a given user uses a portable device, such as a cellular telephone, as a microphone in an auditorium or a lecture hall to transmit the scheduling request in a message (which may be text and/or a telephone call). Moreover, during the queuing a telephone call from the given user may be placed on hold until the given user is selectively coupled to the communication channel, which for example can be a sound system. Alternatively, a place holder for the telephone call may be stored in the queue and the initial telephone call may be discontinued. Then, the given user may be called back when it is time to selectively couple the given user to the communication channel.

By queuing and selectively coupling users to the communication channel, these techniques may facilitate improved management of information exchange during the presentation. In particular, using cellular telephones as microphones may reduce or eliminate the need for users to access the limited number of microphones in an auditorium, thereby facilitating the users asking questions. Moreover, a moderator may be better able to guide the discussion using knowledge of queued questions (such as their subject matter), and the discussions may be more dynamic because users may be better able to interactively ask questions.

While the scheduling of questions during a presentation is used as an illustrative example in the discussion that follows, the techniques described below may be used to facilitate scheduling of a wide variety of requests from multiple users in a physical or virtual environment.

These techniques may be implemented as a stand-alone software application or as a program module or subroutine in another application, such as presentation software, software associated with the communication channel, and/or software associated with a projector. Furthermore, at least a portion of the program may be configured to execute on: a client device or computer (such as a personal computer, a laptop computer, cellular telephone, PDA, or other device capable of manipulating computer readable data), or remotely from a client computer via computing systems over a network (such as the Internet, Intranet, LAN, WAN, MAN, or combination of networks, or other technology enabling communication between computing systems). Therefore, the scheduling requests may be stored locally (for example, on a local computer) and/or remotely (for example, on a computer or server that is accessed via a network).

Figure 1A:
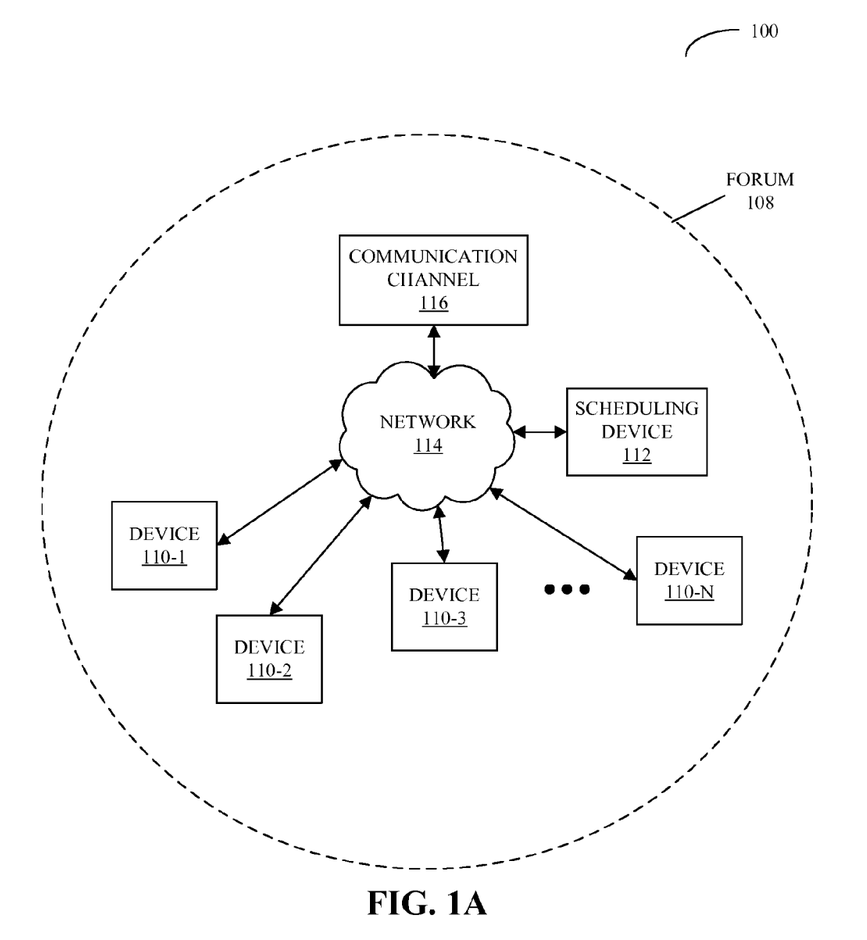
FIG. 1A is a block diagram illustrating a system in accordance with an embodiment of the present invention.

We now describe embodiments of systems, devices and processes for scheduling requests. FIG. 1A presents a block diagram illustrating an embodiment of a system 100. This system may include a forum 108, such as a meeting or presentation. Moreover, the forum 108 may occur in a variety of venues, including: an auditorium, a lecture hall, and/or a stadium.

In the forum 108, a speaker may present information to audience members. Typically, at some point during the presentation, at least some of the audience members may want to ask questions. However, as noted previously, in a large forum 108 this can prove difficult because the audience members will need to be proximate to a microphone in order to access a communication channel 116, which for example can be a speaker or audio system in the venue.

A solution to this problem is for the audience members to ask questions using portable devices 110, such as cellular telephones. In particular, a given audience member may transmit a scheduling request (such as a text message, an email, a video stream, or a telephone call), which includes or is associated with the audience member's question, to a scheduling device 112 using a network 114, such as a wireless network. This scheduling device places a received scheduling requests in one or more queues.

Note that in some embodiments the scheduling requests are positioned in the one or more queues based on a time when the scheduling requests are received and/or based on information associated with the questions. For example, the portable devices 110 and/or the scheduling device 112 may determine the subject matter associated with a particular question, and this information may be used to determine in which queues the associated scheduling request from the users should be placed.

Then, a moderator of the presentation and/or software in the scheduling device 112 may selectively couple particular users to the communication channel 116 through the network 114 so the users can ask their questions. Moreover, once coupled to the communication channel 116, the users can use their portable devices 110 as microphones during a question-and-answer portion of the presentation. In this case, the users are proximate to these 'microphones,' thereby overcoming one of the problems often encountered in existing forums. Note that in some embodiments more than one user may be selectively coupled to the communication channel 116 at the same time.

Moreover, in some embodiments users register with the scheduling device 112 prior to transmitting scheduling requests. For example, the users may register at the beginning of the presentation. During registration, a given user may provide user information, such as one or more identifiers (such as a user name and/or an anonymous acronym) associated with the given user and a communication address. This communication address may include a telephone number associated with one of the portable devices 110 and/or an email address. When users register with the scheduling device 112 or provide an identifier along with their questions, the scheduling device 112 may announce who the next question is from before selectively coupling this user to the communication channel 116.

In some embodiments, the scheduling device 112 includes a bridge, such as a bridge that includes 10 modems. This bridge may receive multiple telephone calls from the portable devices 110 and, at a given time, may selectively couple one or more of these telephone calls (from one or more of the users) to the communication channel 116. Thus, in some embodiments the scheduling device 112 may place one or more telephone calls on hold when queuing the scheduling requests. Alternatively, when a telephone call including a scheduling request is received, the scheduling device 112 may store a place holder for the scheduling request and may then discontinue the telephone call. In these embodiments, scheduling device 112 subsequently calls this user back (for example, using the telephone number provided during registration or using the telephone number used to make the scheduling request) to facilitate the selective coupling.

In some embodiments, either the portable devices 110 and/or the scheduling device 112 convert a voice message to text using speech-recognition software. This operation may facilitate the identification of the subject matter for a given question. In these embodiments, a moderator of the presentation and/or the scheduling device 112 may choose specific question that enhance the presentation and/or emphasize particular subjects. In this way, system 100 may facilitate improved discussions.

In some embodiments, system 100 provides additional information to those users who ask or who are unable to ask their questions during an allotted time interval. For example, the scheduling device 112 may provide a link to a website to users who are unable to ask their questions during the presentation. This website may include an on-line forum, such as a web log or blog, where these users can continue the discussion associated with the presentation and/or may be able to ask their questions.

In some embodiments, system 100 adjusts the selective coupling to reduce feedback effects in the communication channel 116 when the given user asks a question. For example, the scheduling device 112 may monitor the phase and amplitude of an output from speakers in the communication channel 116 to avoid positive feedback.

Figure 1B:
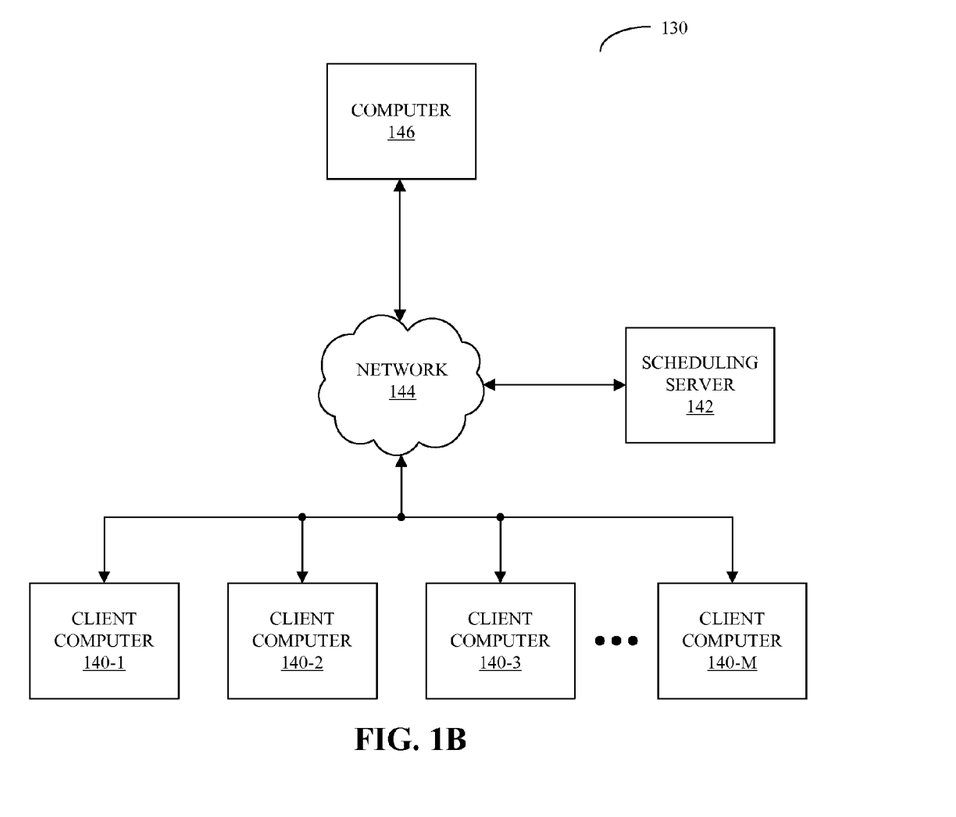
FIG. 1B is a block diagram illustrating a system in accordance with an embodiment of the present invention.

While the system 100 illustrates a forum where the users are physically present, in other embodiments the users may be located remotely from the location where the presentation is occurring, such as during an on-line training session. This is shown in FIG. 1B, which presents a block diagram illustrating an embodiment of a system 130. Within this system, users at client computers 140 may provide scheduling requests (including questions) to scheduling server 142 using a network 144, such as an Intranet or the Internet. Note that scheduling requests may be transmitted using a variety of techniques, including: text messages, email, a video stream, and/or voice messages (such as telephone calls). These scheduling requests may be added to one or more queues in the scheduling server 142.

When the moderator of the presentation or the scheduling server 142 deems it appropriate (such as during a question-and-answer portion of the presentation), the scheduling server 142 may selectively couple one or more of the client computers 140 associated with one or more users to a computer 146 used by the speaker who is giving the presentation. In some embodiments, the scheduling server 142 may also selectively couple one or more of the users to other client computers 140. Note that during the selective coupling process, the one or more users may ask their question using a variety of techniques, including: a text message (such as instant messaging), email, a video stream, and/or voice messages (such as a telephone call or chat)

In some embodiments the system 100 (FIG. 1A) and/or 130 include: fewer or additional components; two or more components are combined into a single component; and/or a position of one or more components may be changed. For example, the scheduling device 112 (FIG. 1A) may be included in hardware and/or software that is used in the forum 108 (FIG. 1A). Consequently, some or all of the functions of the scheduling device 112 (FIG. 1A) may be included in a projector and/or in the communication channel 116 (FIG. 1A). Similarly, some or all of the functions of the scheduling server 142 may be included in the computer 146.

Moreover, while these techniques may be implemented using software that is resident on the scheduling server 142 and/or the computer 146, other embodiments may utilize a software tool that is embedded in a web page (once again, either as a stand-alone application or as a portion of another application). This web page may be provided by a server via network 144. In an exemplary embodiment, the software tool is a software package written in JavaScript™ (i.e., the software tool includes programs or procedures containing JavaScript instructions), ECMAScript (the specification for which is published by the European Computer Manufacturers Association International), VBScript™ (a trademark of Microsoft, Inc.) or any other client or server-side scripting language. In other words, the software tool may include programs or procedures containing JavaScript, ECMAScript instructions, VBScript instructions, or instructions in another programming language suitable for rendering by a browser or another client application on the scheduling server 142 and/or the computer 146.

Figure 2:
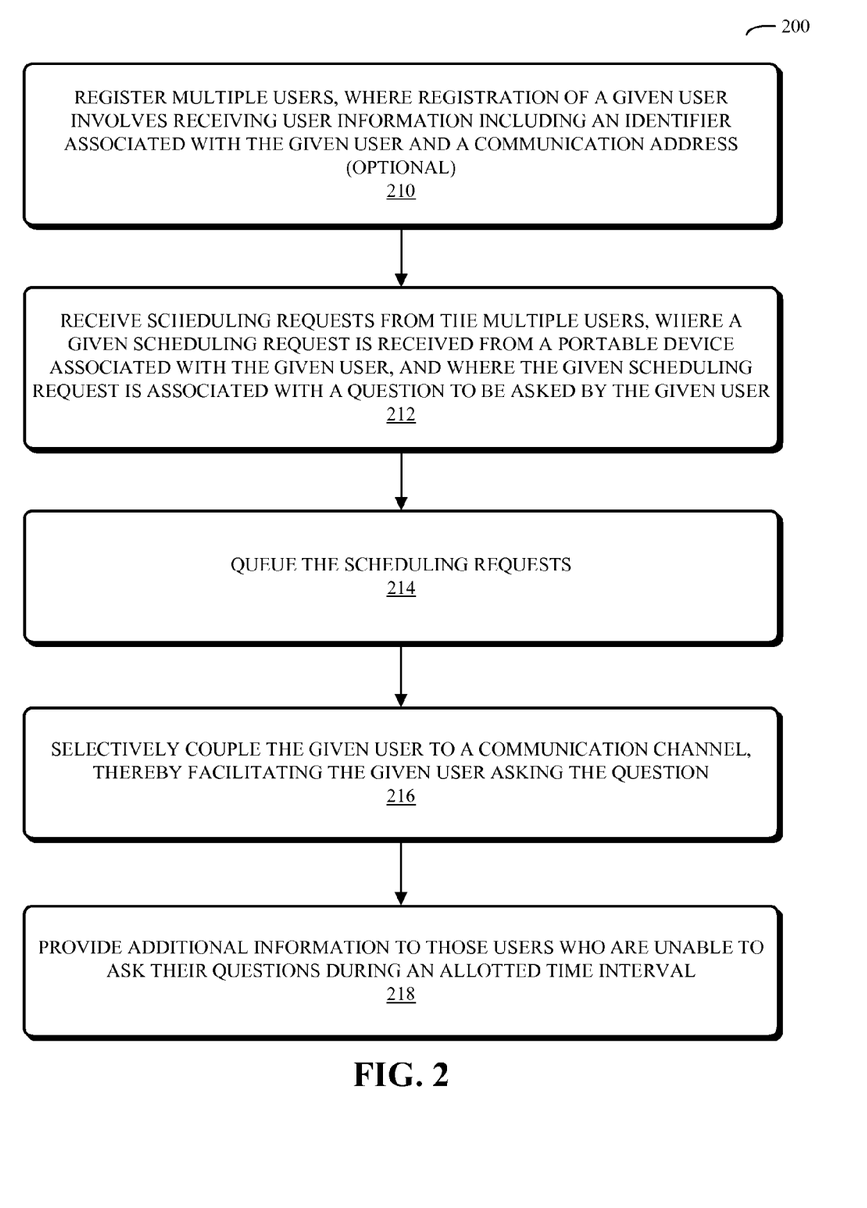
FIG. 2 is a flow chart illustrating a method for scheduling requests in accordance with an embodiment of the present invention.

We now describe embodiments of a process for scheduling requests. FIG. 2 presents a flow chart illustrating an embodiment of a method 200 for scheduling requests, which may be performed by a system. During operation, this system optionally registers multiple users (210), where registration of a given user in the multiple users involves receiving user information including an identifier associated with the given user and a communication address.

Next, the system receives scheduling requests from the multiple users (212), where a given scheduling request is received from a portable device associated with a given user, and where the given scheduling request is associated with a question to be asked by the given user (for example, during a presentation). Then, the system queues the scheduling requests (214) and selectively couples the given user to a communication channel (216), thereby facilitating the given user asking the question.

In some embodiments, the system provides additional information to those users who are unable to ask their questions during an allotted time interval (218). For example, the system may provide links to a website with relevant information or an on-line forum. In this way, users who are unable to ask they questions during the presentation may receive useful information and/or improved customer service.

Note that in some embodiments there may be: additional or fewer operations; the order of the operations may be changed; and two or more operations may be combined into a single operation.

Figure 3:
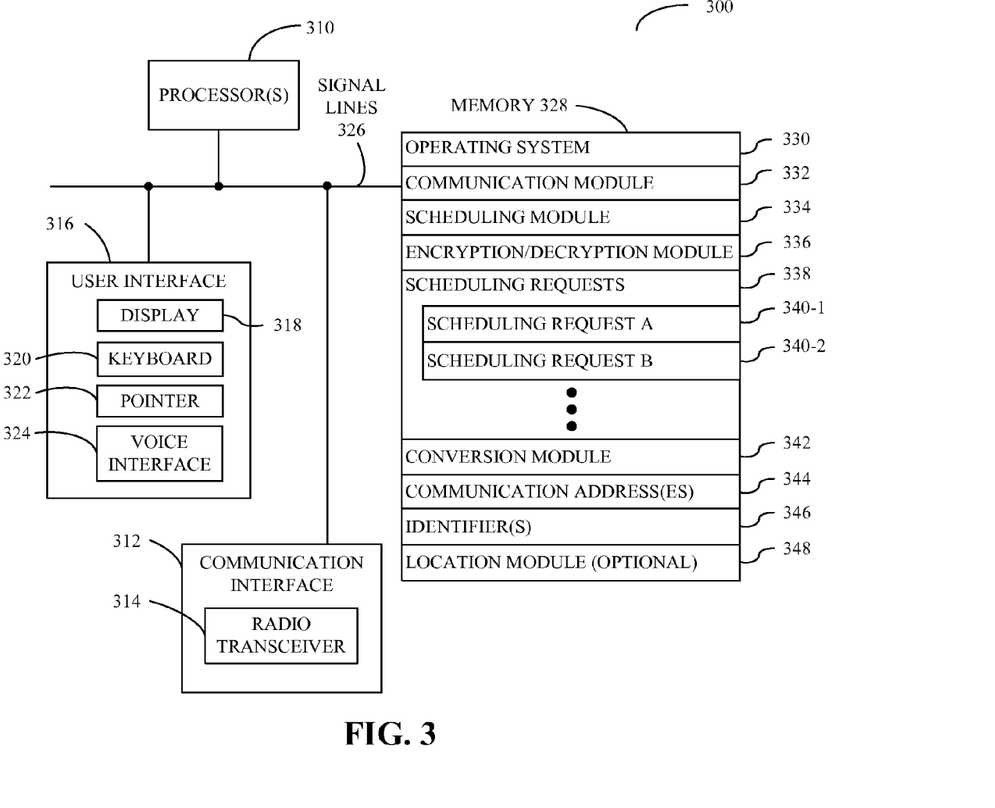
FIG. 3 is a block diagram illustrating a device in accordance with an embodiment of the present invention.

We now describe devices and systems for scheduling requests. FIG. 3 presents a block diagram illustrating an embodiment of a device 300, such as one of the devices 110 (FIG. 1A) and/or one of the client computers 140 (FIG. 1B). Device 300 includes: one or more processors 310, a communication interface 312, a user interface 316, and one or more signal lines 326 coupling these components together. Note that the one or more processing units 310 may support parallel processing and/or multi-threaded operation; the communication interface 312 may include a radio transceiver 314 and/or may have a persistent communication connection; and the one or more signal lines 326 may constitute a communication bus. Moreover, the user interface 316 may include: a display 318, a keyboard 320, a pointer 322 (such as a mouse), and/or a voice interface 324.

Memory 328 in the device 300 may include volatile memory and/or non-volatile memory. More specifically, memory 328 may include: ROM, RAM, EPROM, EEPROM, FLASH, one or more smart cards, one or more magnetic disc storage devices, and/or one or more optical storage devices. Memory 328 may store an operating system 330 that includes procedures (or a set of instructions) for handling various basic system services for performing hardware dependent tasks. Memory 328 may also store communication procedures (or a set of instructions) in a communication module 332. These communication procedures may be used for communicating with one or more computers and/or servers (such as the scheduling device 112 in FIG. 1A and/or the scheduling server 142 in FIG. 1B), including computers and/or servers that are located remotely with respect to the device 300.

Memory 328 may include multiple program modules (or a set of instructions), including: scheduling module 334 (or a set of instructions), encryption/decryption module 336 (or a set of instructions), conversion module 342 (or a set of instructions), and/or optional location module 348. Scheduling module 334 may register a user in a system, such as the system 100 (FIG. 1A) and the system 130 (FIG. 1B). During registration, the device 300 may be provide one or more communication addresses 344 and/or one or more identifiers 346 associated with the user of the device 300. For example, the one or more communication addresses 344 may include a telephone number and/or an email address.

Later during a presentation, the scheduling module 334 may provide one or more scheduling requests 338 (such as scheduling request A 340-1 and/or scheduling request B 340-2) to the scheduling device 112 (FIG. 1A) and/or the scheduling server 142 (FIG. 1B). These scheduling requests may include questions that the user of the device 300 would like to ask during the presentation (for example, during a question-and-answer portion of the presentation). Note that in some embodiments at least some of the communications to and/or from the device 300 are encrypted using encryption/decryption module 336.

In some embodiments, conversion module 342 converts scheduling requests 338 to or from text prior to be provided to the scheduling device 112 (FIG. 1) and/or the scheduling server 142 (FIG. 1B). Moreover, in some embodiments optional location module 348 (such as a GPS module) is used to provide a location of the device 300, such as a location in an auditorium.

Instructions in the various modules in the memory 328 may be implemented in a high-level procedural language, an object-oriented programming language, and/or in an assembly or machine language. The programming language may be compiled or interpreted, i.e., configurable or configured to be executed by the one or more processing units 310.

Although the device 300 is illustrated as having a number of discrete components, FIG. 3 is intended to provide a functional description of the various features that may be present in the device 300 rather than as a structural schematic of the embodiments described herein. In some embodiments, some or all of the functionality of the device 300 may be implemented in one or more ASICs and/or one or more digital signal processors DSPs.

Device 300 may include: fewer components or additional components, two or more components may be combined into a single component, and/or a position of one or more components may be changed. In some embodiments the functionality of the device 300 may be implemented more in hardware and less in software, or less in hardware and more in software, as is known in the art.

Figure 4:
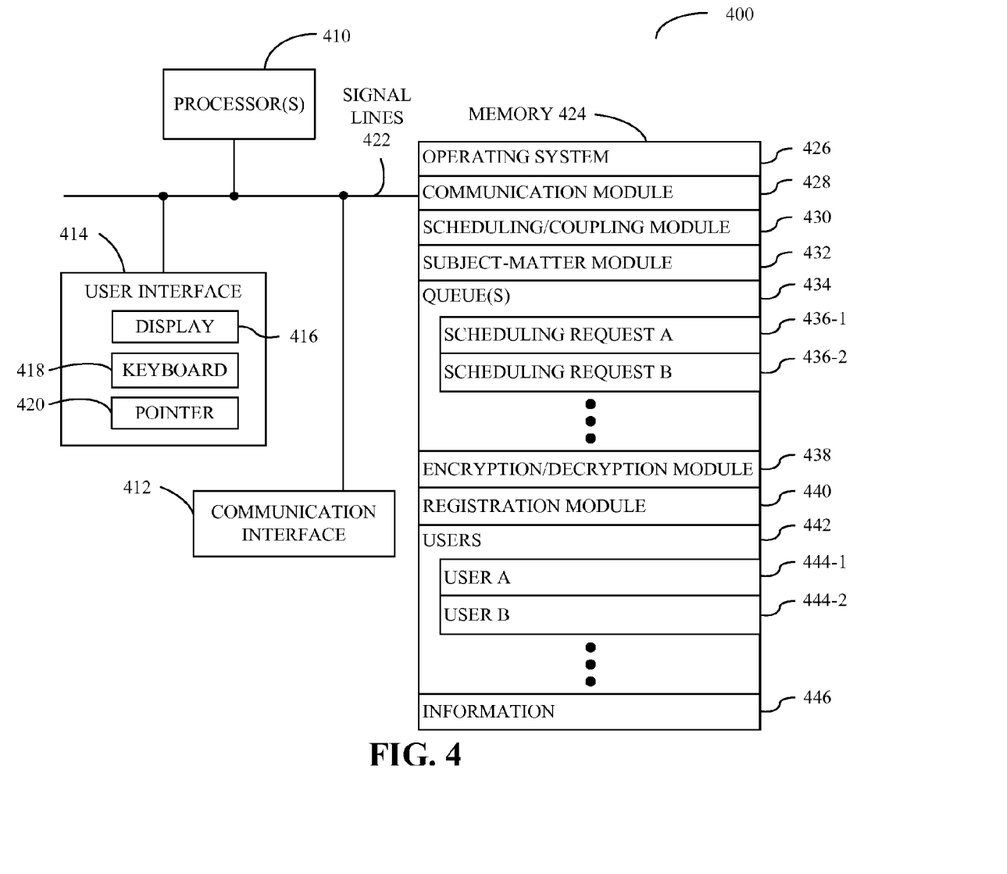
FIG. 4 is a block diagram illustrating a computer system in accordance with an embodiment of the present invention.

FIG. 4 presents a block diagram illustrating an embodiment of a computer system 400 (which may be used in system 100 in FIG. 1A and system 130 in FIG. 1B). Computer system 400 includes: one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, FLASH, one or more smart cards, one or more magnetic disc storage devices, and/or one or more optical storage devices. Memory 424 may store an operating system 426 that includes procedures (or a set of instructions) for handling various basic system services for performing hardware dependent tasks. Memory 424 may also store communication procedures (or a set of instructions) in a communication module 428. These communication procedures may be used for communicating with one or more computers and/or servers, including computers and/or servers that are located remotely with respect to the computer system 400.

Memory 424 may include multiple program modules (or a set of instructions), including: scheduling/coupling module 430 (or a set of instructions), subject-matter module 432 (or a set of instructions), encryption/decryption module 438 (or a set of instructions), and/or registration module 440. During registration, computer system 400 may receive information for users 442 (such as user A 444-1 and/or user B 444-2), including one or more communication addresses and/or one or more identifiers associated with the users 442. Later during a presentation, the scheduling/coupling module 430 may receive one or more scheduling requests (such as scheduling request A 436-1 and/or scheduling request B 436-2), which are added to one or more queue(s) 434. Moreover, in some embodiments subject-matter module 432 determines one or more subjects or topics associated with a given scheduling request (such as scheduling request B 436-2), and the one or more subjects are used to determine to which queue(s) 434 the given scheduling request should be added.

Then, the scheduling/coupling module 430 may selectively couple particular users 442 to a communication channel (such as a sound system), thereby facilitating these users asking questions associated with their scheduling requests 436. Moreover, in some embodiments users 442 who ask their questions and/or users 442 who are unable to asked their questions during the presentation are provided information 446, such as a link to a website or an on-line forum. Note that in some embodiments at least some of the communications to and/or from the computer system 400 are encrypted using encryption/decryption module 438.

Instructions in the various modules in the memory 424 may be implemented in a high-level procedural language, an object-oriented programming language, and/or in an assembly or machine language. The programming language may be compiled or interpreted, i.e., configurable or configured to be executed by the one or more processing units 410.

Although the computer system 400 is illustrated as having a number of discrete components, FIG. 4 is intended to provide a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more ASICs and/or one or more digital signal processors DSPs.

Computer system 400 may include: fewer components or additional components, two or more components may be combined into a single component, and/or a position of one or more components may be changed. In some embodiments the functionality of the computer system 400 may be implemented more in hardware and less in software, or less in hardware and more in software, as is known in the art.

Figure 5:
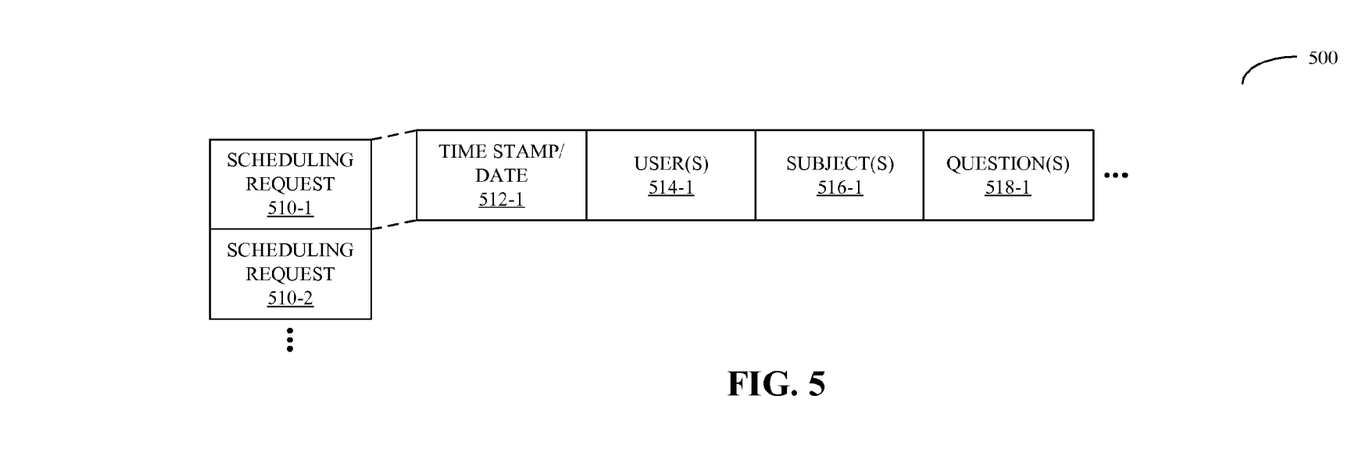
FIG. 5 is a block diagram illustrating a data structure in accordance with an embodiment of the present invention.

We now discuss data structures that may be used in: system 100 (FIG. 1A), system 130 (FIG. 1B), device 300 (FIG. 3), and/or computer system 400. FIG. 5 presents a block diagram illustrating an embodiment of a data structure 500. This data structure may include multiple scheduling requests 510. A given scheduling request, such as scheduling request 510-1, may include information, such as: a time stamp/date 512-1 when the scheduling request 510-1 was received, one or more users 514-1 associated with the scheduling request 510-1, one or more subjects 516-1, and/or one or more questions 518-1.

Figure 6:
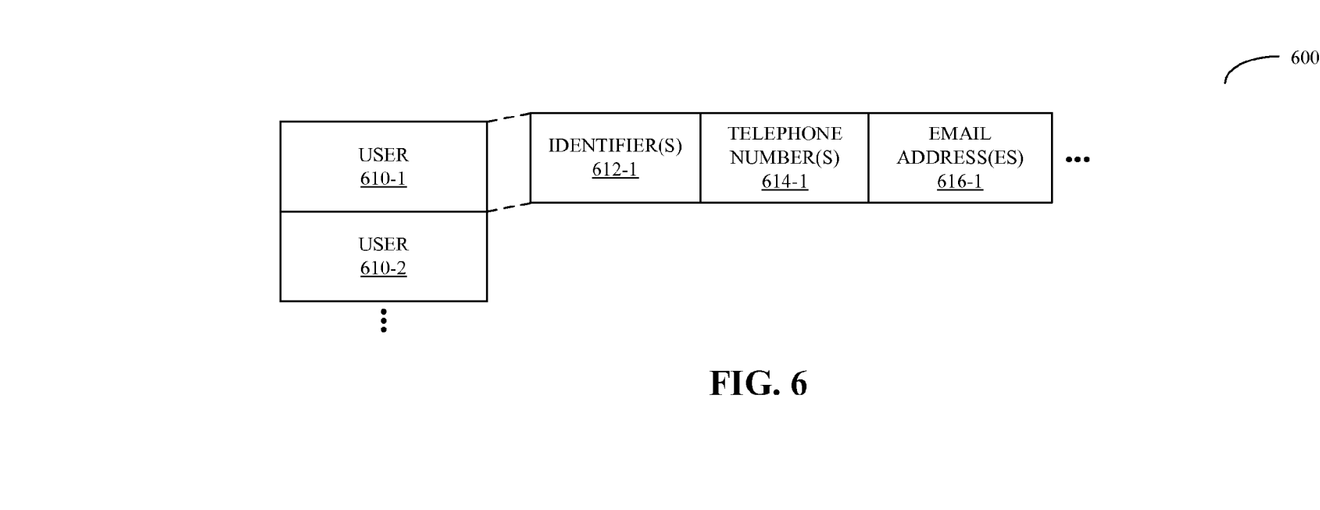
FIG. 6 is a block diagram illustrating a data structure in accordance with an embodiment of the present invention.

FIG. 6 presents a block diagram illustrating an embodiment of a data structure 600. This data structure may include information associated with multiple users 610. Information associated with a given user, such as user 610-1, may include: one or more identifiers 612-1 (such as a user name), one or more telephone numbers 614-1, and/or one or more email addresses 616-1.

Note that that in some embodiments of the data structures 500 (FIG. 5) and/or 600 there may be: fewer or additional components; two or more components may be combined into a single component; and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for scheduling requests, comprising, in a computer, performing the operations of:
   receiving a scheduling request during a presentation from a portable device associated with a user, wherein the scheduling request includes a question asked by the user and contact information associated with the user;
   analyzing the question to determine a subject related to the scheduling request, wherein analyzing the question comprises analyzing a content of the question to determine at least one subject matter to which the question is directed, wherein the subject matter is associated with a queue;
   queuing the scheduling request in a queue associated with the presentation based on the subject; and
   selectively coupling the user to a communication channel by contacting the user according to the contact information in response to the request being selected from the queue, thereby facilitating the user asking the question during the presentation.

2. The method of claim 1, further comprising registering users prior to receiving the scheduling request wherein registration of the user involves receiving contact information associated with the user.

3. The method of claim 2, wherein the contact information includes a telephone number associated with the portable device.

4. The method of claim 2, wherein the contact information includes an email address.

5. The method of claim 1, wherein the portable device includes a cellular telephone.

6. The method of claim 1, wherein the user uses the portable device as a microphone to ask questions during the presentation.

7. The method of claim 6, wherein the user is physically present at a location where the presentation is occurring.

8. The method of claim 6, wherein the user is remotely located from a location where the presentation is occurring.

9. The method of claim 6, wherein the presentation includes an on-line training session.

10. The method of claim 1, wherein the scheduling request for the user includes a message transmitted by the portable device.

11. The method of claim 10, wherein the message includes a text message.

12. The method of claim 10, wherein the message includes a telephone call.

13. The method of claim 12, wherein the queuing involves temporarily placing the telephone call on hold.

14. The method of claim 1, wherein receiving the scheduling request involves converting a voice message to text.

15. The method of claim 1, further comprising providing additional information to those users who are unable to ask their questions during an allotted time interval.

16. The method of claim 1, further comprising adjusting the selective coupling to reduce feedback effects in the communication channel when the user asks the question.

17. A computer program product for use in conjunction with a computer system, the computer program product comprising a non-transitory computer-readable storage medium and a computer-program mechanism embedded therein for scheduling requests, the computer-program mechanism including:
   instructions for receiving a scheduling request during a presentation from a portable device associated with a user, wherein the scheduling request includes a question asked by the user and contact information associated with the user;
   instructions for analyzing the question to determine a subject related to the scheduling request, wherein analyzing the question comprises analyzing a content of the question to determine at least one subject matter to which the question is directed, wherein the subject matter is associated with a queue;
   instructions for queuing the scheduling request in a queue associated with the presentation based on the subject; and
   instructions for selectively coupling the user to a communication channel by contacting the user according to the contact information in response to the request being selected from the queue, thereby facilitating the user asking the question during the presentation.

18. A computer system to schedule requests, comprising:
   a processor;
   a memory;
   a program module, wherein the program module is stored in the memory and configurable to be executed by the processor, the program module including:
      instructions for receiving a scheduling request during a presentation from a portable device associated with a user, wherein the scheduling request includes a question asked by the user and contact information associated with the user;
      instructions for analyzing the question to determine a subject related to the scheduling request, wherein analyzing the question comprises analyzing a content of the question to determine at least one subject matter to which the question is directed, wherein the subject matter is associated with a queue;
      instructions for queuing the scheduling request in a queue associated with the presentation based on the subject; and
      instructions for selectively coupling the user to a communication channel by contacting the user according to the contact information in response to the request being selected from the queue, thereby facilitating the user asking the question during the presentation.

19. The method of claim 12, wherein the queuing involves storing a place holder for contacting the user based on the contact information and discontinuing contact with the user.

* * * * *